United States Patent [19]

Langhoff et al.

[11] Patent Number: 5,015,457

[45] Date of Patent: May 14, 1991

[54] PROCESS FOR THE HYDROGENATION OF ORGANOCHLORINE COMPOUNDS, NEUTRALIZATION OF THE HYDROCHLORIC ACID OBTAINED AND A NEUTRALIZATION AGENT FOR HYDROCHLORIC ACID OBTAINED FROM ORGANOCHLORINE COMPOUNDS

[75] Inventors: Josef Langhoff, Dinslaken; Alfons Jankowski; Klaus-Dieter Dohms, both of Essen, all of Fed. Rep. of Germany

[73] Assignee: Ruhrkohle AG, Essen, Fed. Rep. of Germany

[21] Appl. No.: 394,728

[22] Filed: Aug. 15, 1989

[51] Int. Cl.[5] .......................... C01B 7/01; C01B 7/07

[52] U.S. Cl. .................................. 423/481; 423/240; 423/488

[58] Field of Search ...................... 423/240, 481, 488; D16/11

[56] References Cited

U.S. PATENT DOCUMENTS

| | | | |
|---|---|---|---|
| 2,481,300 | 9/1949 | Engel | 208/262.1 |
| 3,483,128 | 12/1969 | Rodi et al. | 252/632 |
| 3,935,295 | 1/1976 | La Hue et al. | 208/262.1 |
| 4,022,795 | 5/1977 | Bamfield et al. | 208/262.5 |
| 4,351,978 | 9/1982 | Hatano et al. | 585/469 |
| 4,761,221 | 8/1988 | Rossi et al. | 423/240 |
| 4,810,365 | 3/1989 | Dohler et al. | 208/262.5 |

FOREIGN PATENT DOCUMENTS

| | | |
|---|---|---|
| 0257260 | 3/1988 | European Pat. Off. . |
| 0308669 | 3/1989 | European Pat. Off. . |
| 3641205 | 6/1988 | Fed. Rep. of Germany . |
| 3708039 | 10/1988 | Fed. Rep. of Germany . |
| 3723607 | 1/1989 | Fed. Rep. of Germany . |

OTHER PUBLICATIONS

"Die hydrierende Dehalogenierung . . . ", Horner and Schläfer, 1959, pp. 1700–1705.

*Primary Examiner*—Gary P. Straub
*Assistant Examiner*—Brian M. Bolam
*Attorney, Agent, or Firm*—Nils H. Ljungman & Associates

[57] ABSTRACT

The preferred invention describes a process for the hydrogenation of organochlorine compounds and a neutralizing agent for hydrochloric acid which is obtained from organochlorine compounds.

5 Claims, 1 Drawing Sheet

PROCESS FOR THE HYDROGENATION OF ORGANOCHLORINE COMPOUNDS, NEUTRALIZATION OF THE HYDROCHLORIC ACID OBTAINED AND A NEUTRALIZATION AGENT FOR HYDROCHLORIC ACID OBTAINED FROM ORGANOCHLORINE COMPOUNDS

BACKGROUND OF THE INVENTION

1. Field of the Invention:

This invention relates to a process for the hydrogenation of organochlorine compounds containing chlorine, and, in particular, of waste materials containing chlorine, in which the hydrochloric acid obtained from the organochlorine compound is neutralized.

OBJECTS OF THE INVENTION

An object of the invention, with a process of the type indicated above, is to eliminate the negative consequences of the addition of neutralization agent. Such negative consequences include the adverse effects of the hydrogenation plant, such as clogging which is caused by precipitated salts, etc.

Another object is to provide a neutralization agent to prevent such problems.

SUMMARY OF THE INVENTION

These objects are achieved by providing a neutralization agent which is fluid under the reaction conditions, or the neutralization agent is soluble, in particular uniformly soluble in oil, or the neutralization agent is carried on a carrier material, in particular a large-pore carrier material.

As a result of the invention, the precipitations observed with other neutralization agents, particularly the precipitation of the neutralization agent or neutralization product and the resulting clogging of the hydrogenation plant, no longer occur and any desired organochlorine compounds whose hydrogenation proceeds according to the general formula:

$$RCl + H_2 \rightarrow RH + HCl$$

can be successfully hydrogenated according to the process proposed by the invention, without the occurrence of harmful side-effects.

Appropriate configurations which achieve the object of the invention, particularly, a large bandwidth of reaction conditions and components which react with one another as well as ease of handling for the production or use of the neutralization agent, are described herein.

The compounds which can be used and the process steps according to the invention do not have any particular exceptions, in relation to their composition or the process conditions, so that the selection criteria conventionally used in the application in question can be applied without major restrictions. In particular, they can also be advantageously used independently of one another to achieve the object, or at least part of the object of the invention.

In summary, one aspect of the invention resides broadly in a method for hydrogenation of an organochlorine compound and for at least partially neutralizing resultant hydrochloric acid comprising the steps of obtaining at least one organochlorine compound, hydrogenating the organochlorine compound to obtain at least hydrochloric acid and neutralizing at least some of the hydrochloric acid by exposing the hydrochloric acid to an agent thereby causing the hydrochloric acid to react with the agent. The agent, is a member selected from the group which consists essentially of a neutralizing agent which is a fluid, a neutralizing agent which is soluble in a fluid, and a neutralizing agent which is deposited on a carrier material.

Another aspect of the invention resides broadly in a method of hydrogenation of an organochlorine compound comprising the steps of providing an agitating vessel, positioning an organochlorine compound in the agitating vessel, placing a neutralizing agent on a carrier material, placing the neutralization agent and the carrier material in the agitating vessel, mixing the organochlorine compound and the neutralization agent in the agitating vessel to form a mixture, providing a preheating vessel, transferring the mixture to the preheating vessel, heating the mixture to a predetermined temperature in the preheating vessel, providing a reactor vessel, transferring the mixture to the reactor vessel, applying a predetermined pressure and heating the mixture to a predetermined temperature in the reactor vessel to generate at least hydrochloric acid, depositing the hydrochloric acid on the carrier material to neutralize the hydrochloric acid by the neutralizing agent, separating the mixture into a first sub-mixture which consists essentially of the neutralized hydrochloric acid on the carrier material and a second sub-mixture, and separating the first sub-mixture from the second sub-mixture.

Yet another aspect of the invention resides broadly in an agent for neutralizing hydrochloric acid, the hydrochloric acid being formed by the hydrogenation of an organochlorine compound, wherein the agent comprises a carrier material and a neutralizing agent for neutralizing hydrochloric acid which is deposited on the carrier material.

BRIEF DESCRIPTION OF THE DRAWINGS

The invention may be better understood if the Description of the Preferred Embodiments is taken in conjunction with the appended drawing in which.

DESCRIPTION OF THE PREFERRED EMBODIMENTS

Figure 1:
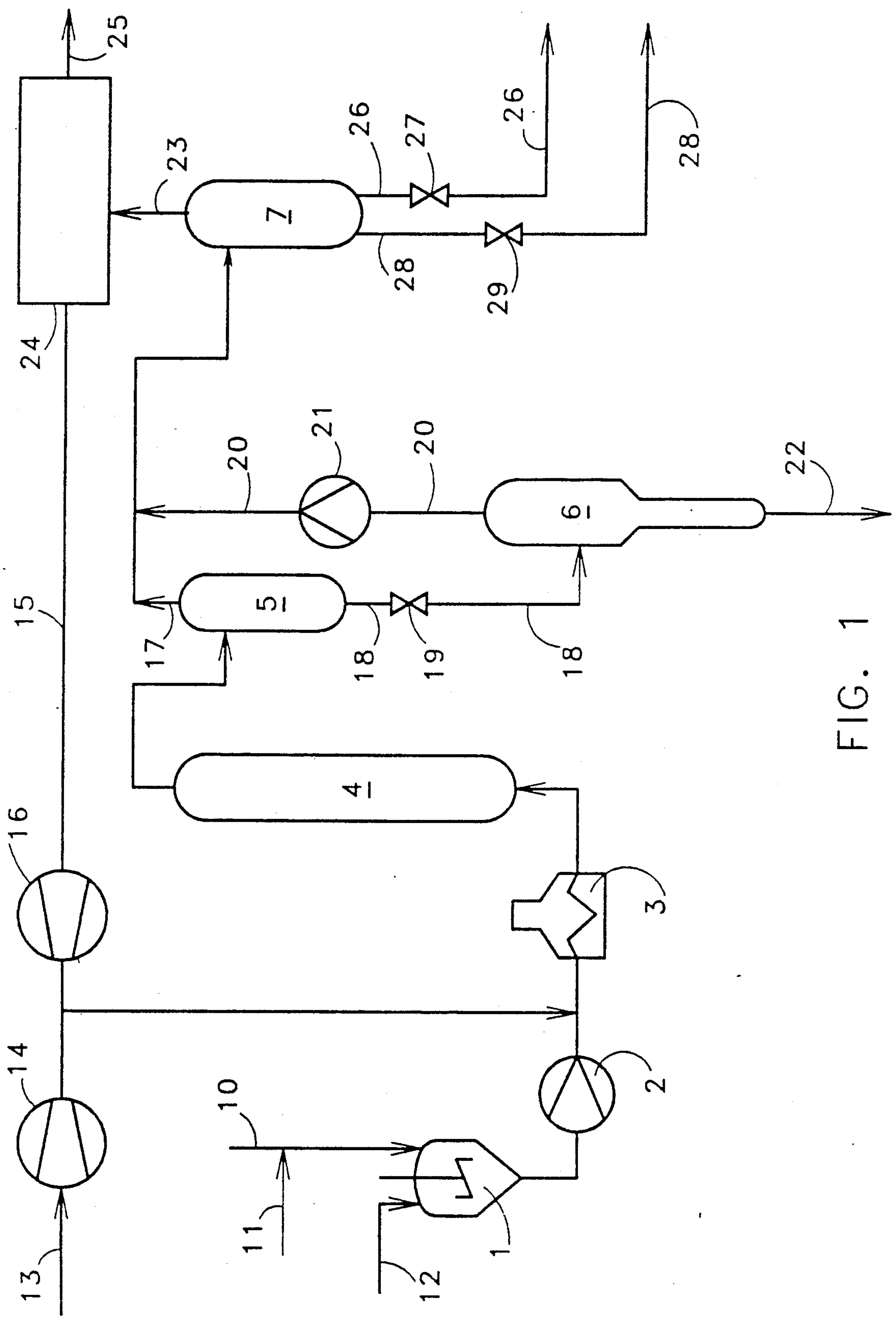
FIG. 1 is a schematic diagram of the process of the present invention.

In a first series of tests, bases from the first main group of the periodic table, or their salts, were used with weak acids, which are present in molten form under reaction conditions, e.g., NaOH (Fp 318° C.), Na-acetate (Fp 324° C.) or Na-formate (Fp 253° C.). Fp may mean freezing point. There were no disruptions caused by clogging, but the neutralization was not completely effective in eliminating HCl without a trace. More intimate contact between the molten neutralization agent and the gaseous HCl, than was possible in the test installation used, was probably necessary. Therefore, improvements are conceivable here to achieve 100% neutralization by more intimate contact and sufficient hold time.

In another series of tests, Na-phenolate was used for neutralization. The compound is soluble in oil, i.e., it is or can be uniformly distributed. Under reaction conditions, no disruptions were caused by clogging. The HCl was completely neutralized according to the following equation:

$$NaOC_6H_5 + Hcl \rightarrow NaCl + C_6H_5OH$$

Hydrogenation was, thereby, conducted under the following conditions, which had also been maintained during the first series of tests:

Average temperature in the reactor was 460° C. with a pressure of 280 bar hydrogen. The specific throughput of a used oil with 0.5 wt. % chlorine in the form of polychlorinated biphenyls was 0.5 kg oil per liter of reactor volume per hour. Twice the stoichiometric amount of Na-phenolate, in relation to chlorine, had been added to the oil, i.e., 33 g Na-phenolate/kg oil.

The phenol formed was partly rehydrogenated under the hydrogenation conditions to cyclohexane. Industrial applications are worth considering, typically, only if Na-phenolate is available cheaply, e.g., as a waste product from the dephenolating of coking plant waste water.

Theoretically, other oil-soluble sodium salts, e.g., salts of organic acids, may be used. Other compounds suitable as neutralization agents, in particular sodium compounds and their preferred physical properties, may be used, whereby the neutralization agents are present under reaction conditions in molten form, or are soluble in oil.

The best neutralization method, however, turned out to be the use of a neutralization agent on a carrier material, as used in a third series of tests:

Bases and/or their salts with weak acids from the first main group of the periodic table, e.g., NaOH, $Na_2CO_3$ or $Na_2S$ are particularly well-suited as neutralization agents. Bases of earth alkalis and/or their salts with a weak acid, e.g., $Ca(OH)_2$, $CaCO_3$ or $Ca(HCO_3)_2$ can be used with substantially equally satisfactory results.

Particularly advantageous is a saturation of the carrier material with aqueous $Ca(HCO_3)_2$ solution, since it results in particularly high solubility and a subsequent transformation into low-solubility $CaCO_3$ during a drying process of the saturated carrier material. The result is a high degree of immobilization of the neutralization agent. The transformation into the low-solubility calcium carbonate takes place according to the formula:

$$Ca(HCO_3)_2 \rightarrow CaCO_3 + CO_2 + H_2O$$

The solubility of $Ca(HCO_3)_2$ in water at 20° C. is 16.6 g per 100 g of water. The solubility of $CaCO_3$ at 18° C. is $1.5 \times 10^{-3}$ g per 100 g of water.

Preferred carrier materials are materials with a large surface, in particular porous materials, which are also commonly used as catalyst carriers, e.g., $Al_2O_3$, activated carbon, activated coke, brown coal coke, brown coal coke breeze, Fuller's earth or metallurgical coke.

In this third series of tests, the carrier material was saturated with the dissolved neutralization agent, e.g., $Na_2S$ in aqueous solution, and the water was eliminated by drying. Oil-soluble neutralization agents in organic solution can also be used, e.g., Na-phenolate in crude oil, which is economically advantageous in industrial applications on account of the lower heat of vaporization compared to water. After removing the water or solvent, the neutralization agent is finely distributed over the surface and in the pores of the carrier material.

The particular advantage of this method is, primarily, that the neutralization agent is immobilized on the carrier and cannot be deposited on the walls in the preheater or the reactor and cannot, therefore, cause disruptions by clogging. Salt deposits in the preheater tubes are also prevented. Such deposits would also have an adverse effect on the heat transmission.

An additional advantage of the distribution of the neutralization agent in a large-surface carrier material, in particular a porous carrier material, lies in the fine distribution which favors the capture of the gaseous HCl and has an effect which is comparable to that of a uniformly distributed neutralization agent.

Long-term tests with neutralization agent on carrier material in a laboratory installation also caused no disruptions. The HCl is captured as NaCl and is transferred outward with the carrier material from the high pressure system at the hot separator sump.

The hydrogenating treatment in the sump-phase of oils contaminated with chlorine by using neutralization agent on carrier material is explained below, with reference to FIG. 1, which is a simplified flow diagram of a laboratory installation. The following is intended as an example only and is in no way meant to limit the claimed invention to those particular parameters only.

Oil contaminated with chlorine and having the following composition:

Used oil, e.g., used motor oil from motor vehicles, with 0.5 wt. % organochlorine in the form of polychlorinated biphenyls, e.g., is reacted in agitator vessel 1 with a superstoichiometric quantity of neutralization agent in relation to chlorine on carrier material and, if necessary, with the required amount of hydrogenation catalyst. The amount of neutralization agent is determined by the concentration of chlorine in the oil used and the concentration of the neutralization agent on the carrier. For example, the neutralization agent can be:

1. a neutralization agent which is molten under reaction conditions such as NaOH, Na-acetate, Na-formate;
2. an oil-soluble neutralization agent such as Na-phenolate, Na-salts of higher organic acids; or
3. a neutralization agent, applied to or already present on a carrier material, such as Na , $Na_2S$, $CaCO_3$, CaO, $Ca(HCO_3)_2$.

The carrier material can be, for example, activated carbon, with a grain size of about 50–200 mm and with a surface of 200–400 $m^2/g$.

One-way catalysts were used, for example, as the hydrogenation catalyst. Suitable economical catalysts include iron oxide, which has long been used in the hydrogenation of coal, and Bayer compound from the production of aluminum, in an amount of approximately 2 wt. % in relation to oil.

The mixture of oil and neutralization agent is transported by pump 2 into the high pressure region and is reacted with hydrogen, e.g., under the following conditions.

The mixture is heated in preheater 3 to the reaction temperature, e.g., 440° C., and is then transferred into sump-phase reactor 4 and is there reacted at a pressure of about 50 to 300 bar and temperatures between 300° C. and 500° C., preferably between 300° C. and 450° C. The removal of hydrochloric acid from organochlorine compound with the formation of HCl occurs to some extent even in the preheater, but it takes place essentially in sump-phase reactor 4. The HCl is spontaneously neutralized and is deposited as salt on the carrier material. The product stream leaving sump-phase reactor 4, and consisting of oil vapors, solids and gases, is separated in downstream hot separator 5 into two phases, namely into tops and a sump product. At the sump of hot separator 5, the mixture of neutralization agent and salt is transported outward with the heavy-oil fractions and transported to vacuum tower 6, where it is freed of distillable oils. The vacuum residue separated downward in vacuum tower 6 contains all the chlorine in the form of NaCl on the carrier material.

The tops of hot separator 5 consist of chlorine-free oil, gases ($C_1$ to $C_4$) and hydrogen. The further treatment of this tops stream, in particular in downstream cold separator, is part of the prior art and is not included in the invention.

As shown schematically in FIG. 1, an organochlorine compound and neutralization agent are placed within agitating vessel 1 through pipes 10 and 11 respectively. A catalyst may also be place within agitating vessel 1 through pipe 12. The mixture flows from agitating vessel 1 by pump 2 to preheater 3. Also, hydrogen may be provided to preheater 3 by pipe 13 and pump or one way device 14. Also, recycled gas may also be provided to preheater 3 through pipe 15 and pump or one way device 16. The mixture from preheater 3 is then transferred to sump-phase reactor 4 and then to separator 5. In separator 5, the mixture is separated into at least two different phases, such as tops and some product Tops are transported to down-stream cold separator 7 through pipe 17 while sump product flows through pipe 18 and valve 19 into vacuum tower 6. Sump product from pipe 18 is further separated into at least two phase which may include mixture in pipe 20 which may include salt and oil which is transported through pump or one way valve 21 and may also include neutralization agent in pipe 22. The mixture from pipe 20 is combined with tops in pipe 17 and flows into cold separator 7. Gas in pipe 23, from separator 7, is transported to gas cleaning unit 24 where it is further separated into recycled gas in pipe 15 and processed gas in pipe 25. The remainder from cold separator 7, such as water in pipe 26 which is transported through valve 27 and product oil in pipe 28 which is transported through valve 29 are discharged. The term "pipe" used herein may be any suitable conduit or other apparatus for transporting the above-recited substances.

According to the invention, therefore, the organochlorine compounds may be hydrogenated together with certain oils such as oils contaminated with chlorine, whereby the hydrogenation in the presence of hydrogenatable oils means that the hydrogenation heat released benefits the removal of hydrochloric acid.

A prior art method for the hydrogenation of coals, tars and heavy oils, in particular in the so-called sump-phase, includes Mathias Pier's IG Process, and is described in the standard work on hydrogenation technology, "Katalytische Druckhydrierung von Kohlen, Teeren und Mineraloel" ("Catalytic Pressure Hydration of Coals, Tars and Oils") by Dr. Walter Kroenig, published by SpringerVerlag, 1950. This document is hereby incorporated by reference as if set out in its entirety herein.

The chlorine content in coals is low, so that in general, the neutralization of the HCl obtained, principally in the so-called sump-phase hydrogenation, is of secondary importance. For special applications of sump-phase hydrogenation, in which $NH_4Cl$ in particular is added, or for the hydrogenation of coals with a relatively high chlorine content, however, so much HCl is formed during hydrogenation that it must be neutralized on account of its corrosive properties. Generally, this neutralization is accomplished by the addition of $Na_2S$ to the coal, or by feeding in Na dispersed in heavy oil, at a suitable point in the hydrogenation plant.

With regard to the problem of substances containing chlorine in the hydrogenation of coal, the reader is referred to the above-mentioned book by Dr. Walter Kroenig.

From German Patent Application P 37 23 607.5, it is also known that used oils can be hydrogenated and processed into secondary raffinate, to remove any organochlorine compounds which may be present, in particular polychlorinated biphenyls ("PCB"). Such organochlorine compounds, in particular the highly-toxic dibenzenodioxin and diphenylene oxide, are obtained if the secondary raffinate is burned, e.g., as lubricating oil in internal combustion engines. PCB is contained, for example, in cutting oils, hydraulic oils, in particular for mining, in transformer oils and in similar oils, because they make the oils non-flammable On the other hand, PCB cannot be broken down microbiologically and is persistent and ubiquitous and, therefore, found to an increasing extent in the food chain, such as in fish, human milk, etc. Other substances, containing flammable organochlorine compounds, can be disposed of without polluting the environment only in high-temperature combustion plants, because otherwise highly-toxic compounds, such as dioxin, are formed.

It has been shown that the hydrogenation treatment of organochlorine compounds represents a viable alternative to high temperature combustion, in which ecologically objectionable or harmful by-products or waste products are not obtained Possible methods for the implementation of the process described above can be found in German Patent Application P 37 23 607.5. In this process, hydrogenation may be conducted in a sump-phase and the HCl formed during hydrogenation from the organochlorine compound is neutralized by the addition of a neutralization agent. The neutralization agent added can be, among other things, $Na_2S$ or soda, whereby the HCl formed is eliminated according to the equation:

$$Na_2S+2\ HCl=2\ NaCl+H_2S$$

Surprisingly, tests in a continuously operating laboratory installation have now shown that, in contrast to the use of oils originating from coal, salts such as $Na_2S$, $Na_2CO_3$ or NaCl were precipitated from the oil in a preheater and reactor system and led to caking and clogging, so that it was no longer possible to operate the installation. Even with the addition of a neutralization agent in the form of an aqueous solution, e.g., as a soda solution or a sodium sulfide solution, under the reaction conditions of 300 bar and temperatures of 300° C. to 500° C., the water in the heat exchanger and preheater evaporated and salts were deposited, causing the problems mentioned above.

An example of an IG Process may be found in U.S. Pat. No. 3,867,305, entitled "Amorphous Hydrocarbon Conversion Catalysts and Process for Preparing Same." Patents relating to a Hydrogenation Process may be found in U.S. Pat. No. 4,696,735, entitled "Method and Apparatus for Multiphase Coal Hydrogenation Reactors with Exothermal Heat of Reaction Having Gas Cooling in Sump-phase Reactors"; U.S. Pat. No. 4,636,300, entitled "Integrated Gas-phase Hydrogenation Process Using Heat Recovered from Sump-phase Hydrogenation for Temperature Regulation" and U.S. Pat. No. 4,602,992, entitled "Coal Hydrogenation Process with Integrated Refining Stage."

Examples of PCBs may be found in U.S. Pat. No. 4,804,779, entitled "Chemical Detoxification of Polychlorinated Biphenyls (PCBS)": U.S. Pat. No. 4,659,443, entitled "Halogenated Aromatic Compound Removal and Destruction Process" and U.S. Pat. No. 4,400,936, entitled "Method of PCB Disposal and Apparatus Therefor."

All the above-mentioned patents, patent applications and publications are hereby incorporated by reference as if the contents thereof were set forth in their entirety herein.

From the preferred embodiment discussed hereinabove, it should be clear that alterations could be made to the invention without departing from the scope of the invention as claimed.

In summary, this invention relates to a process, in particular a refining process, for the hydrogenation of organochlorine compounds, e.g., of carbonaceous materials containing chlorine, and, in particular, of waste materials containing chlorine, in which the hydrochloric acid obtained from the organochlorine compound is neutralized. The invention also relates to a neutralization agent for hydrochloric acid obtained from organochlorine compounds.

One aspect of the invention resides broadly in a process for the hydrogenation of organochlorine compounds, in which the hydrochloric acid obtained from the organochlorine compound is neutralized, characterized by the fact that under reaction conditions, the neutralization agent is fluid or is soluble in oil or is present or deposited on a carrier material.

Another aspect of the invention is characterized by the fact that the neutralization agent which is fluid under reaction conditions has a melting point under reaction conditions below 350° C.

Yet another aspect of the invention is characterized by the fact that as the neutralization agent, bases or their salts with weak acids from the first or second main group of the periodic system are used.

A further aspect of the invention is characterized by the fact that the neutralization agent used is NaOH, Na-acetate and/or Na-formate.

Yet a further aspect of the invention is characterized by the fact that the neutralization agent used is Na-phenolate, or Na-salts, in particular oil-soluble Na-salts, of organic acids, in particular higher organic acids, e.g., Na-soaps.

A yet further aspect of the invention is characterized by the fact that the neutralization agent on carrier material is NaOH, $Na_2CO_3$, $Na_2S$, CaO, $CaCO_3$ or $Ca(HCO_3)_2$ or Na-phenolate.

Another further aspect of the invention is characterized by the fact that the carrier material used is $Al_2O_3$, activated carbon, activated coke, brown coal coke, brown coal coke breeze, Fuller's earth or metallurgical coke.

Yet another further aspect of the invention is characterized by the fact that the carrier material is a granular, finely ground material, produced, in particular, by an extrusion step.

A still further aspect of the invention is characterized by the fact that the carrier material is saturated with the neutralization agent.

Yet another further aspect of the invention is characterized by the fact that the neutralization agent is present in solution during the saturation.

A yet still further aspect of the invention is characterized by the fact that the neutralization agent is deposited on the carrier material and is then transformed into an insoluble form.

A further aspect of the invention is characterized by the fact that the neutralization agent is first deposited on the carrier material and is then dried.

Yet another still further aspect of the invention is characterized by the fact that the carrier material is removed as a vacuum residue.

A still further aspect of the invention resides in a neutralization agent for hydrochloric acid obtained from organochlorine compounds, characterized by the fact that the neutralization agent is on a carrier material.

The invention as described hereinabove in the context of a preferred embodiment is not to be taken as limited to all of the provided details thereof, since modifications and variations thereof may be made without departing from the spirit and scope of the invention.

What is claimed is:

1. Method for hydrogenation of an organochlorine compound and for at least partially neutralizing resultant hydrochloric acid, comprising the steps of:

obtaining at least one organochlorine compound;

hydrogenating said organochlorine compound to obtain at least hydrochloric acid; and neutralizing at least some of said hydrochloric acid by exposing said hydrochloric acid to an agent at a temperature of between 300° C. to 500° C. and a pressure of about 50 to 300 bar thereby causing said hydrochloric acid to react with said acid;

said agent during said reaction consisting essentially of a member selected from the group consisting of: (a) a neutralization agent which is soluble in a fluid; and (b) a neutralization agent which is deposited on a carrier material; and said neutralization agent consists essentially of a Na-salt of an organic acid.

2. The method according to claim 1, wherein:

said neutralization agent consists essentially of Na-phenolate.

3. Method for hydrogenation of an organochlorine compound and for at least partially neutralizing resultant hydrochloric acid, comprising the steps of:

obtaining at least one organochlorine compound;

hydrogenating said organochlorine compound to obtain at least hydrochloric acid; and neutralizing at least some of said hydrochloric acid by exposing said hydrochloric acid to an agent at a temperature of between 300° C. to 500° C. and a pressure of about 50 to 300 bar thereby causing said hydrochloric acid to react with said acid;

said agent during said reaction consisting essentially of a neutralization agent which is soluble in a fluid; and said fluid in which said neutralizing agent is soluble is an oil.

4. The method according to claim 3, wherein said neutralization agent consists essentially of a Na-salt of an organic acid.

5. The method according to claim 4, wherein said Na-salt of an organic acid consists essentially of a member selected from the group consisting of: (a) Na-acetate, (b) Na-formate, (c) Na-phenolate, and (d) combinations of members of the group.

* * * * *

UNITED STATES PATENT AND TRADEMARK OFFICE
CERTIFICATE OF CORRECTION

PATENT NO. : 5,015,457

DATED : May 14, 1991

INVENTOR(S) : Josef LANGHOFF, et al.

It is certified that error appears in the above-identified patent and that said Letters Patent is hereby corrected as shown below:

In column 4, line 38, after 'as', delete "Na,".

In column 5, line 67, after the first instance of 'in', delete "Na", and insert --$Na_2CO_3$,--.

In column 6, line 41, delete the equation: "$Na_2S + 2\ HCl = 2\ NaCl + H_2S$" and insert --$Na_2S + 2\ HCl \rightarrow 2\ NaCl + H_2S$--.

Signed and Sealed this

Twenty-second Day of September, 1992

*Attest:*

DOUGLAS B. COMER

*Attesting Officer*

*Acting Commissioner of Patents and Trademarks*